United States Patent
McGovern et al.

(10) Patent No.: US 7,937,374 B2
(45) Date of Patent: May 3, 2011

(54) ELECTRONIC DATA MANAGEMENT

(75) Inventors: Brian Patrick McGovern, Brookfield, CT (US); Melinda Vulgaris Armenti, Trenton, NJ (US); Vanessa Jean Cavorti, East Setauket, NY (US); Lauren Elise Clement, New York, NY (US); Debanshu Debroy, Kendall Park, NJ (US); Bradley Jay Epperson, Stamford, CT (US); Dang Hai Ly, Flushing, NY (US); Pamela Regan, Long Beach, NY (US); Lisa Marie Spadaro, Brooklyn, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 970 days.

(21) Appl. No.: 11/773,472

(22) Filed: Jul. 5, 2007

(65) Prior Publication Data

US 2009/0012998 A1    Jan. 8, 2009

(51) Int. Cl.
  *G06F 7/00* (2006.01)
  *G06F 17/00* (2006.01)
(52) U.S. Cl. ......... 707/683; 707/695; 707/806; 715/229
(58) Field of Classification Search ................. 707/638, 707/695, 806, 999.203; 715/229
  See application file for complete search history.

(56) References Cited

U.S. PATENT DOCUMENTS

| | | | | |
|---|---|---|---|---|
| 2002/0069143 | A1* | 6/2002 | Cepeda | 705/30 |
| 2003/0093790 | A1* | 5/2003 | Logan et al. | 725/38 |
| 2004/0010419 | A1* | 1/2004 | Sinnott | 705/2 |
| 2004/0162822 | A1* | 8/2004 | Papanyan et al. | 707/4 |
| 2005/0256934 | A1* | 11/2005 | Motoyama | 709/208 |
| 2008/0270989 | A1* | 10/2008 | Ahadian et al. | 717/126 |

* cited by examiner

*Primary Examiner* — John Breene
*Assistant Examiner* — Phong Nguyen
(74) *Attorney, Agent, or Firm* — Fletcher Yoder, PC

(57) ABSTRACT

A method of electronically administering instructions, includes receiving a new instruction; creating new instruction metadata from the new instruction; comparing the new instruction metadata to a data set of existing instruction metadata to identify existing instructions corresponding to the new instruction; determining whether the new instruction metadata indicates that the new instruction revises an existing instruction; comparing the new instruction to any corresponding existing instructions, where the new copy instruction metadata does not indicate that the new instruction revises an existing instruction, to determine if the new instruction revises the existing instructions; initiating revision workflow where the new instruction is determined to revise an existing instruction; and storing the new instruction metadata in the data set of existing instruction metadata and the new instruction in a corresponding data set of existing instructions. A system for electronically administering hundreds of instructions per hour and a computer program for electronically administering a new instruction are also presented.

28 Claims, 3 Drawing Sheets

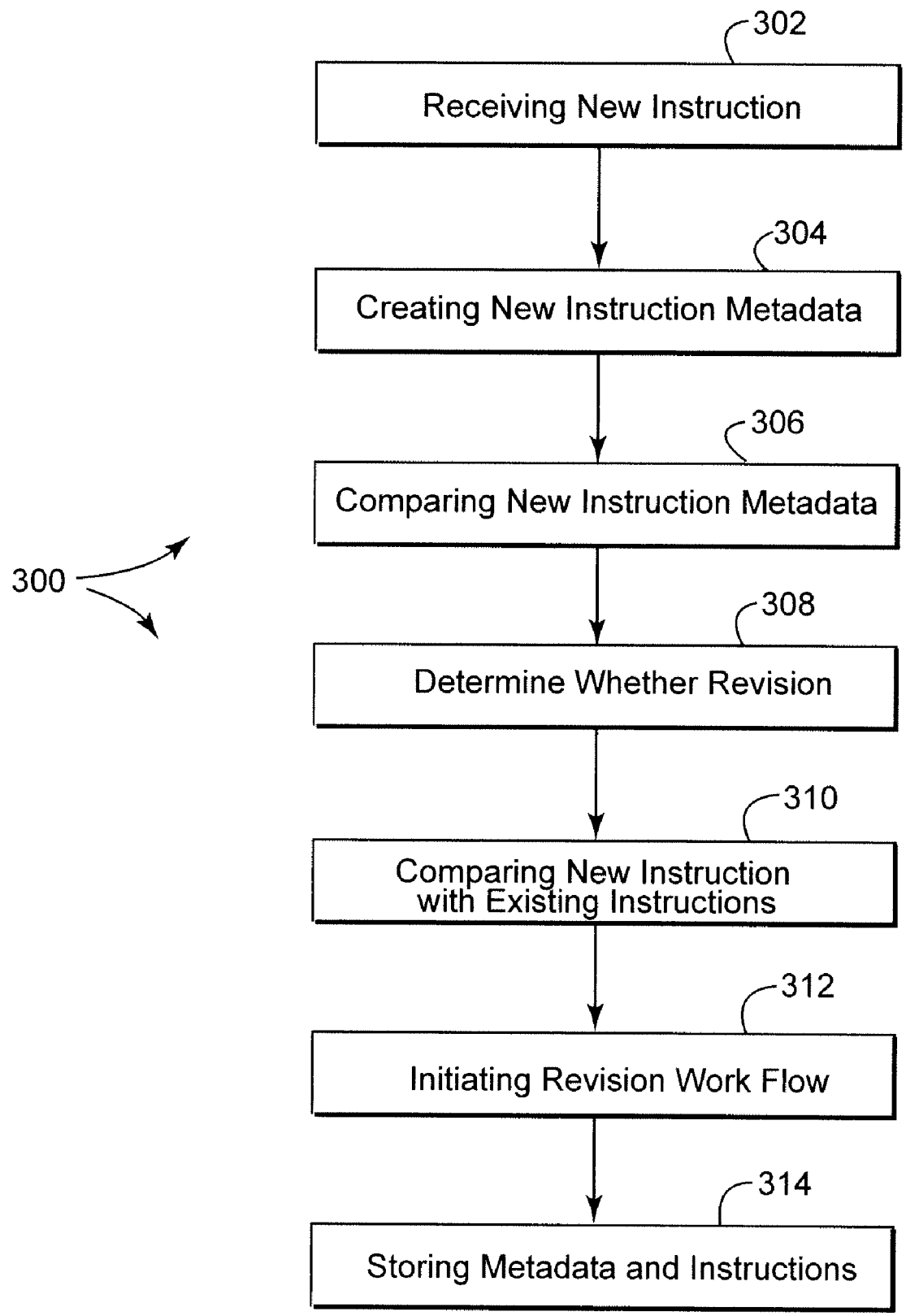

ELECTRONIC DATA MANAGEMENT

BACKGROUND OF THE INVENTION

1. Field of the Invention

The subject matter described herein relates generally to electronically administering data streams and, more particularly, to electronically administering instructions embodied in electronic data.

2. Related Art

The receipt and administration of instructions for the broadcasting of commercials, such as advertisements during a television program, by a network broadcasting company is a complex process involving the adept administration of voluminous information. Currently, paper copy instructions (sometimes referred to herein as CIs) are received from, e.g., advertising agencies that act on behalf of advertising clients. The copy instructions generally provide, among other things, an ISCI code corresponding to a particular media that should be broadcasted, a flight start date, flight end date and a time to be broadcasted. Clerks review the copy instructions manually and enter pertinent information, such as the ISCI code, into a traffic system that supplies network programming to a transmitter. Many times revisions to the copy instructions are received, thus constant vigilance is required to prevent errors such as broadcasting a commercial according to an outdated copy instruction.

Voluminous advertising information is administered, as described above, by, for example, NBC Universal Inc. (NBCU). NBCU broadcasts approximately 1.6 million commercials per year and receives over 165,000 copy instructions per year (that includes approximately 600-800 faxes per day that are received in 13 separate streams) that generate over $5 billion dollars in advertisement sales revenue. In 2006, NBCU had $4.6 million in discrepancies of which $3.9 million resulted from errors within the current system and process.

It is now desired to eliminate the disadvantages, and reduce the number of errors, of the current system and process.

BRIEF DESCRIPTION OF THE INVENTION

In accordance with an embodiment of the present invention, a method of electronically administering instructions, comprises receiving a new instruction; creating new instruction metadata from the new instruction; comparing the new instruction metadata to a data set of existing instruction metadata to identify existing instructions corresponding to the new instruction; determining whether the new instruction metadata indicates that the new instruction revises an existing instruction; comparing the new instruction to any corresponding existing instructions, where the new copy instruction metadata does not indicate that the new instruction revises an existing instruction, to determine if the new instruction revises the existing instructions; initiating revision workflow where the new instruction is determined to revise an existing instruction; and storing the new instruction metadata in the data set of existing instruction metadata and the new instruction in a corresponding data set of existing instructions.

In accordance with another embodiment of the invention, a system for electronically administering hundreds of instructions per hour, comprises a data receiver for receiving a new instruction and a processor connected in circuit with the data receiver to receive the new instruction. A memory device may be connected in circuit with the processor that stores a data set of existing instruction metadata and a corresponding data set of existing instructions. The processor may be configured to create new instruction metadata from the new instruction; compare the new instruction metadata to the data set of existing instruction metadata to identify existing instructions corresponding to the new instruction; determine whether the new instruction metadata indicates that the new instruction revises an existing instruction; compare the new instruction to any existing instructions retrieved from the data set of instructions that correspond to the existing instruction metadata, where the new instruction metadata does not indicate that the instruction revises an existing instruction, to determine if the new instruction revises the existing instructions; initiate revision workflow where the new instruction is determined to revise an existing instruction; and store the new instruction metadata in the data set of existing instruction metadata and the new instruction in the data set of existing instructions.

In accordance with a further embodiment of the present invention, a computer program, embodied on a computer readable medium for electronically administering a new instruction, comprises computer code for creating new instruction metadata from the new instruction; comparing the new instruction metadata to a data set of existing instruction metadata to identify existing instructions corresponding to the new instruction; determining whether the new instruction metadata indicates that the new instruction revises an existing instruction; comparing the new instruction to any corresponding existing instructions, where the new copy instruction metadata does not indicate that the instruction revises an existing instruction, to determine if the new instruction revises the existing instructions; initiating revision workflow where the new instruction is determined to revise an existing instruction; and storing the new instruction metadata in the data set of existing instruction metadata and the new instruction in a corresponding data set of existing instructions.

BRIEF DESCRIPTION OF THE DRAWINGS

The following detailed description is made with reference to the accompanying drawings, in which:

FIG. 3 is a flow diagram showing a method for electronically administering instructions in accordance with another embodiment of the present invention.

DETAILED DESCRIPTION OF THE PREFERRED EMBODIMENT

One embodiment of the present invention concerns a system and a method for electronically administering instructions in a generally more efficient manner and in a manner that reduces errors. In one particular embodiment, the instructions are advertising copy instructions.

Figure 1:
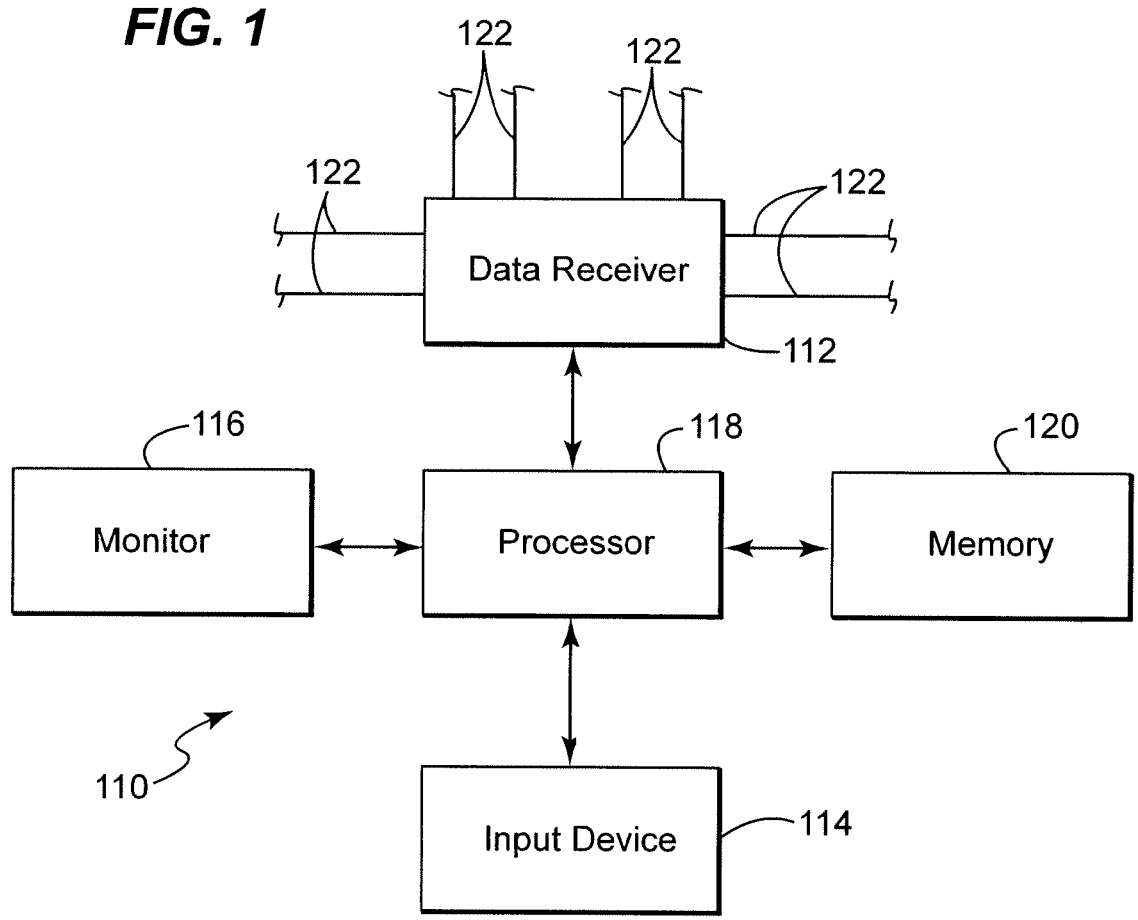
FIG. 1 is a block diagram showing a system for electronically administering instructions in accordance with one embodiment of the present invention.

Referring now to FIG. 1, a system for electronically administering instructions, in accordance with one embodiment of the present invention, is illustrated generally at 110. In this embodiment, the system 110 comprises a data receiver 112, an input device 114, a monitor 116, a processor 118 and associated memory 120.

The data receiver 112 may comprise a facsimile device such as a facsimile server as illustrated, although, it will be appreciated that a facsimile machine and subsequent scanner (not shown) may be employed. Also, instead of or in addition to the facsimile device, the data receiver 112 may comprise, among other things, an email server for receiving instructions via email or a packet data wireless receiver. The data receiver 112 may be connected via telephone lines 122 to receive instructions, such as advertising copy instructions. It will be appreciated that eight telephone lines 122 are shown, although, the number of telephone lines may vary depending upon the volume of instructions received.

The input device 114 may comprise a keyboard that provides for input by an operator (not shown) to the processor 118 in a known manner. The monitor 116 may comprise a flat panel display using known liquid crystal display technology and provides output from processor 118 to the operator in a known manner.

The processor 118 is in circuit with each of the data receiver 112, the input device 114, the monitor 116 and the memory 120. The processor 118 may be any suitably fast and complex programmable digital electronic component that is capable of executing computer code such as software and/or firmware and may be available from the Intel Corporation found at the Internet address: http://www.intel.com.

The memory 120 may be any number of suitable types such as RAM, ROM, flash, magnetic hard disk and/or optical disk. The memory 120, in a known manner, provides for the short term and long term storage of data required by the processor 18 to function as described in more detail below.

Figure 2:
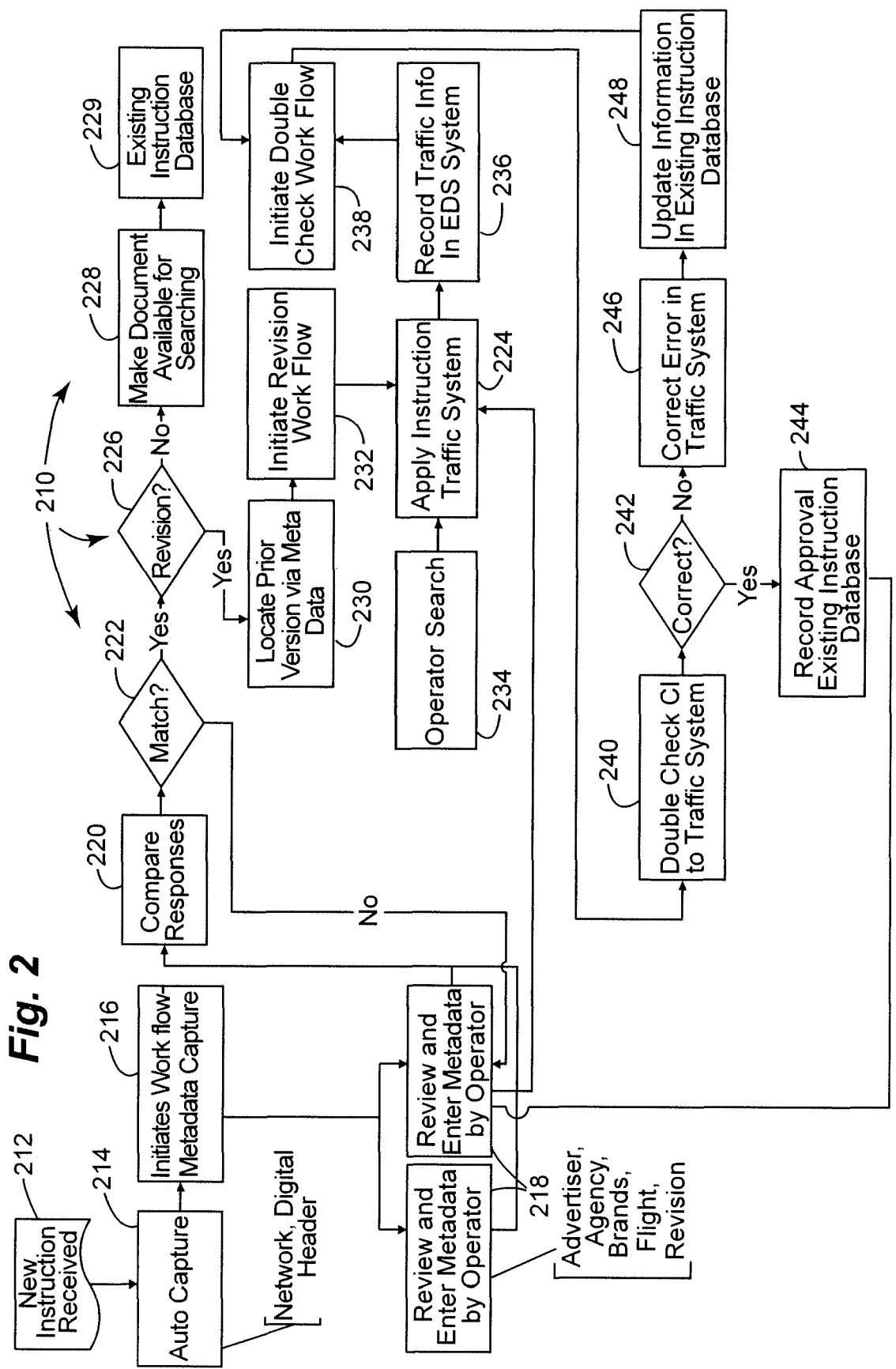
FIG. 2 is a flow chart showing process flow in accordance with the embodiment of FIG. 1.

The processor 118 may be configured, for example via a computer program, in conjunction with an operator, to process instructions as shown generally at 210 in FIG. 2. In this way, a new instruction to be processed is received from the data receiver 112 (FIG. 1) at 212. The new instruction is stripped of any metadata at 214 that is provided with the new instruction. For example, the metadata may be contained in a digital header in the case of an instruction sent by facsimile. The metadata is reviewed to determine whether there is any usable information. In the case of a new advertising copy instruction, the metadata may be reviewed to determine whether it provides an advertiser name, an agency name, a flight start date, a flight end date, a programming time, a particular show, a brand and whether the new instruction is a revision of an existing instruction. This may be accomplished using optical character recognition software and, in particular, by using this software to recognize and identify key text fields and their subsequent details, and parse those into the metadata attributes.

As seen at 216, a module of computer code may be provided to initiate workflow to capture metadata via entry by an operator and to review any metadata stripped off at 214 for validity. Manual entry and/or review of stripped metadata may be carried out as shown at 218, e.g., for accuracy. Each set of metadata may then be compared with an existing database of metadata to determine whether a match exists. This function is labeled as "compare responses" in 220 and in the decision diamond labeled "match?" in 222. Where no match is found, a return for review by an operator as shown at 218 is carried out. Where it is found during the review of a finding of no match that there are no errors in, e.g. entry of the instructions, the instructions then may be entered into the traffic system at 224 as described in more detail below. Where a match is found, a determination of whether the metadata contains a positive indication that a revision of existing instructions may be made at 226. Where there is a negative indication of a revision, the instructions may be made available for searching as at 228 in an existing instruction database 229, and/or be placed into a queue for later retrieval, by an operator. Where there is a positive indication of a revision, the metadata is used to locate the prior version at 230 and, thereafter, revision work flow is initiated at 232. Initiating revision work flow 232 includes inserting the instructions into a traffic system at 224. The traffic system may comprise a system for carrying out the instruction provided. In the embodiment where the instruction comprises an advertising copy instruction the traffic system performs the function of using the copy instruction as business rules to schedule the advertising spots.

It will be appreciated that the revision work flow may also entail, queuing up and/or routing a file, including both an existing instruction and a new instruction, for work by a particular operator such as a clerical staff member.

An operator may also be required to manually search as shown at 234 through the existing instruction database 229. The instructions may then be applied to the traffic system, as described above, at 224.

Communication from the traffic system may be directed at 236 to record/update information about the instructions, such as Transaction Date, Flight Date, Contract #, ISCI, Advertiser and Brand, from the traffic system in the existing instruction database 229. Thereafter, a double check work flow may be initiated at 238 to confirm that the proper instruction was entered into the traffic system. This may entail routing the instruction to an operator, such as a clerk, for review of the entry of the instruction to the traffic system as shown at 240. A decision diamond is provided at 242 and where it is determined that the instruction was correctly entered to the traffic system, an approval of that may be entered into the existing instruction database 229. Where an error is found, the traffic system entry is corrected at 246 and the existing instruction database 229 may be updated as shown at 248.

A method of electronically administering instructions in accordance with another embodiment of the present invention is shown generally at 300 in FIG. 3. The method comprises receiving a new instruction as shown at 302 and creating new instruction metadata from the new instruction as shown at 304. The method may further comprise, as shown at 306, comparing the new instruction metadata to a data set of existing instruction metadata to identify existing instructions corresponding to the new instruction and determining whether the new instruction metadata indicates that the new instruction revises an existing instruction as shown at 308. The method may still further comprise, as shown at 310, comparing the new instruction to any corresponding existing instructions, where the new copy instruction metadata does not indicate that the new instruction revises an existing instruction, to determine if the new instruction revises the existing instructions. As shown at 312 the method may additionally comprise initiating revision workflow where the new instruction is determined to revise an existing instruction and, as shown at 314, storing the new instruction metadata in the data set of existing instruction metadata and the new instruction in a data set of existing instructions.

Technical effects of the herein described systems and methods include determining whether a new instruction contains metadata, whether a new instruction is a revision of an existing instruction and providing that to an operator.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A method of electronically administering instructions, comprising:

receiving a new instruction;

creating new instruction metadata from the new instruction;
comparing the new instruction metadata to a data set of existing instruction metadata to identify existing instructions corresponding to the new instruction;
determining whether the new instruction metadata indicates that the new instruction revises an existing instruction;
comparing the new instruction to any corresponding existing instructions, where the new copy instruction metadata does not indicate that the new instruction revises an existing instruction, to determine if the new instruction revises the existing instructions;
initiating revision workflow where the new instruction is determined to revise an existing instruction; and
storing the new instruction metadata in the data set of existing instruction metadata and the new instruction in a corresponding data set of existing instructions.

2. The method of claim 1, wherein initiating revision workflow comprises forwarding the new instruction along with the existing instructions for operator review.

3. The method of claim 2, wherein initiating revision workflow further comprises:
initiating double check workflow comprising forwarding the new instruction along with the existing instructions for a second operator review;
storing the revision approval data in a data set of approval data for each operator review; and
initiating another double check workflow where the approval data for each operator review is inconsistent.

4. The method of claim 3, wherein initiating double check workflow comprises overcoming a predetermined threshold.

5. The method of claim 4, wherein the predetermined threshold comprises at least one of price of advertising spot, flight start date and flight end date.

6. The method of claim 1, wherein creating new instruction metadata is carried out using optical character recognition software.

7. The method of claim 1, wherein creating new instruction metadata is carried out by operator input.

8. The method of claim 1, further comprising identifying additional new instruction metadata from the new instruction as received.

9. The method of claim 1, wherein the new instruction metadata comprises at least one of an advertiser name, an agency name, a flight start date, a flight end date, a programming time, a particular show, a brand and whether the new instruction is a revision of an existing instruction.

10. The method of claim 1, wherein receiving the new instruction comprises receiving the new instruction via a facsimile device and/or an email server.

11. The method of claim 1, wherein the new instruction and the existing instructions comprise advertising copy instructions.

12. A system for electronically administering hundreds of instructions per hour, comprising:
a data receiver for receiving a new instruction;
a processor connected in circuit with the data receiver to receive the new instruction; and
a memory device connected in circuit with the processor, the memory device storing a data set of existing instruction metadata and a corresponding data set of existing instructions;
wherein the processor is configured to:
create new instruction metadata from the new instruction;
compare the new instruction metadata to the data set of existing instruction metadata to identify existing instructions corresponding to the new instruction;
determine whether the new instruction metadata indicates that the new instruction revises an existing instruction;
compare the new instruction to any existing instructions retrieved from the data set of instructions that correspond to the existing instruction metadata, where the new instruction metadata does not indicate that the instruction revises an existing instruction, to determine if the new instruction revises the existing instructions;
initiate revision workflow where the new instruction is determined to revise an existing instruction; and
store the new instruction metadata in the data set of existing instruction metadata and the new instruction in the data set of existing instructions.

13. The system of claim 12, wherein the processor is further configured to initiate revision workflow by forwarding the new instruction along with the existing instructions for operator review.

14. The system of claim 13, wherein the processor is further configured to initiate revision workflow by:
initiating double check workflow comprising forwarding the new instruction along with the existing instructions for a second operator review;
storing the revision approval data in a data set of approval data for each operator review; and
initiating another double check workflow where the approval data for each operator review is inconsistent.

15. The system of claim 14, wherein initiating double check workflow comprises overcoming a predetermined threshold.

16. The system of claim 15, wherein the predetermined threshold comprises at least one of price of advertising spot, flight start date and flight end date.

17. The system of claim 12, wherein the processor is further connected in circuit with an optical character recognition device for use in creating new instruction metadata.

18. The system of claim 12, wherein the processor is further configured to receive operator input for creating new instruction metadata.

19. The system of claim 12, wherein the data receiver comprises a facsimile device and wherein the processor is further configured to identify additional new instruction metadata on an electronic header as received by the facsimile device.

20. The system of claim 12, wherein the data receiver comprises an email server.

21. The system of claim 12, wherein the new instruction metadata comprises at least one of an advertiser name, an agency name, a flight start date, a flight end date, a programming time, a particular show, a brand and whether the new instruction is a revision of an existing instruction.

22. The system of claim 12, wherein the new instruction and the existing instructions comprise advertising copy instructions.

23. A computer program embodied on a computer readable medium for electronically administering a new instruction, the computer program comprising computer code for:
creating new instruction metadata from the new instruction;
comparing the new instruction metadata to a data set of existing instruction metadata to identify existing instructions corresponding to the new instruction;

determining whether the new instruction metadata indicates that the new instruction revises an existing instruction;

comparing the new instruction to any corresponding existing instructions, where the new copy instruction metadata does not indicate that the instruction revises an existing instruction, to determine if the new instruction revises the existing instructions;

initiating revision workflow where the new instruction is determined to revise an existing instruction; and storing the new instruction metadata in the data set of existing instruction metadata and the new instruction in a corresponding data set of existing instructions.

24. The computer program of claim 23, wherein the computer code for initiating revision workflow comprises computer code for forwarding the new instructions along with the existing instructions for operator review.

25. The computer program of claim 24, wherein the computer code for initiating revision workflow further comprises computer code for:

initiating double check workflow comprising forwarding the new instructions along with the existing instructions for a second operator review;

storing the revision approval data in a data set of approval data for each operator review; and initiating another double check workflow where the approval data for each operator review is inconsistent.

26. The computer program of claim 25, wherein initiating double check workflow comprises overcoming a predetermined threshold.

27. The computer program of claim 26, wherein the predetermined threshold comprises at least one of price of advertising spot, flight start date and flight end date.

28. The computer program of claim 23, wherein the new instruction and the existing instructions comprise advertising copy instructions.

* * * * *